(12) United States Patent
Hisata et al.

(10) Patent No.: US 8,199,691 B2
(45) Date of Patent: Jun. 12, 2012

(54) MOBILE COMMUNICATION SYSTEM, WIRELESS CONTROLLER, AND EXTENSION TRANSMITTING/RECEIVING SERVER DEVICE SELECTING METHOD

(75) Inventors: Hiroko Hisata, Nerima-ku (JP); Masafumi Masuda, Yokosuka (JP); Yasuyuki Watanabe, Yokosuka (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 495 days.

(21) Appl. No.: 12/513,936

(22) PCT Filed: Nov. 8, 2007

(86) PCT No.: PCT/JP2007/071695
§ 371 (c)(1),
(2), (4) Date: May 7, 2009

(87) PCT Pub. No.: WO2008/056731
PCT Pub. Date: May 15, 2008

(65) Prior Publication Data
US 2010/0008298 A1 Jan. 14, 2010

(30) Foreign Application Priority Data
Nov. 8, 2006 (JP) .................................. 2006-302788

(51) Int. Cl.
*H04B 7/14* (2006.01)
(52) U.S. Cl. ........................................................ 370/315
(58) Field of Classification Search .................. None
See application file for complete search history.

(56) References Cited

U.S. PATENT DOCUMENTS

| 6,026,295 A | 2/2000 | Okada |
| 2005/0014498 A1 | 1/2005 | Yamada et al. |
| 2005/0136950 A1 | 6/2005 | Masuda et al. |

FOREIGN PATENT DOCUMENTS

| EP | 1 799 002 A1 | 6/2007 |
| JP | 08-237736 A | 9/1996 |
| JP | 2000-125326 | 4/2000 |
| JP | 2000-287248 A | 10/2000 |
| JP | 2004-364054 A | 12/2004 |
| JP | 2005-142964 A | 6/2005 |
| JP | 2006-108891 A | 4/2006 |
| JP | 2006-303624 A | 11/2006 |

(Continued)

OTHER PUBLICATIONS

Takeshi Hattori, et al., "Wireless Broadband Textbook", IDG Japan Co., Ltd., pp. 26-37 + 2 pages, Jun. 10, 2002, w/Partial Translation (pp. 26-29).

(Continued)

*Primary Examiner* — Anh-Vu Ly
(74) *Attorney, Agent, or Firm* — Crowell & Moring LLP

(57) ABSTRACT

An appropriate selection is controlled for selecting an extension transmitting/receiving server device for transmitting or receiving user data, to be transmitted or received between mobile station devices, to or from a radio base station device by employing extension transmission or reception of data, in a radio access network relaying data between a core network having a mobile switch station and the mobile station devices. While referring to a management table for managing statuses of extension transmitting/receiving server devices 30a to 30c, at least one of the extension transmitting/receiving server devices 30a to 30c is selected. The user data transmitted or received between mobile station devices through the selected extension transmitting/receiving server device is transmitted. This allows the control of an appropriate selection from the extension transmitting/receiving server devices.

5 Claims, 17 Drawing Sheets

FOREIGN PATENT DOCUMENTS

JP        2006-333385 A     12/2006

OTHER PUBLICATIONS

"3GPP TR 25.933", V5.4.0 (2003-12), pp. 1-138.

International Search Report.
1. Japanese Office Action w/Translation, dated Jan. 5, 2011, total of 4 pages.
PCT/JP2007/071695 Translation of PCT/ISA/237.
PCT/JP2007/071695 PCT/IB/338.
PCT/JP2007/071695 PCT/IB/373.

FIG. 3

| BS-DTM NUMBER | REPRESENTATIVE NodeB NUMBER | SUSPENDED | MAINTENANCE MODE | HEALTH CHECK | LOAD | TEST REGISTRATION |
|---|---|---|---|---|---|---|
| 30a | 20a | OPERATING | OPERATING | OK | 20% | PRESENT |
| 30b | 20b | OPERATING | MAINTENANCE | OK | 10% | NONE |
| 30c | ⋮ | SUSPENDED | OPERATING | NG | 0% | NONE |

90

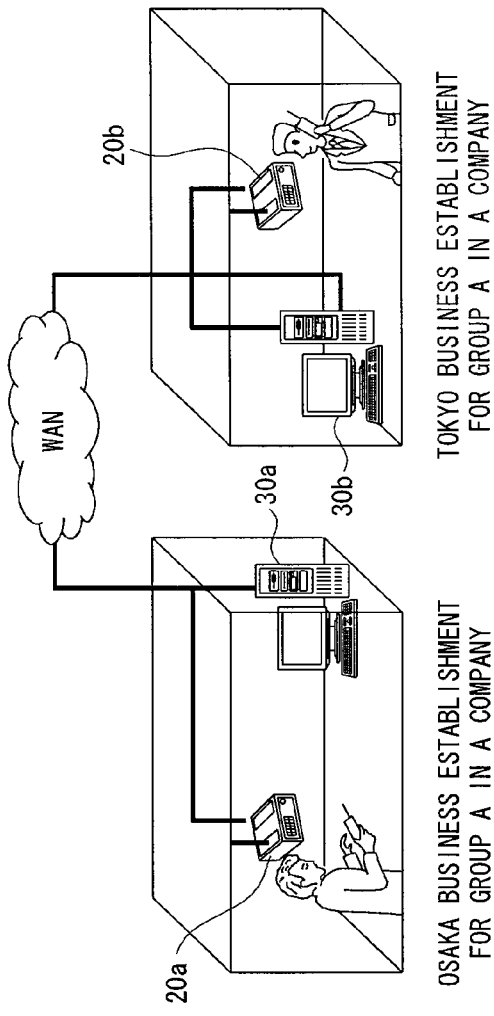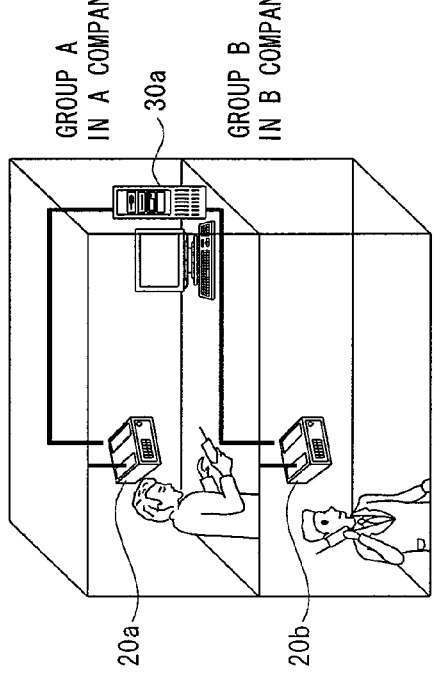

Prior Art

Prior Art

MOBILE COMMUNICATION SYSTEM, WIRELESS CONTROLLER, AND EXTENSION TRANSMITTING/RECEIVING SERVER DEVICE SELECTING METHOD

TECHNICAL FIELD

The present invention relates to a mobile communication systems, a wireless controller, and an extension transmitting/receiving server device selecting method, and more particularly to a mobile communication system, a wireless controller, and an extension transmitting/receiving server device selecting method in which the data is transmitted or received between mobile wireless terminals in a radio access network without passing through a core network.

BACKGROUND ART

A typical mobile communication system is shown in FIG. 8. A mobile communication system 400 includes mobile station devices (Mobile Station: hereinafter referred to as an MS) 410a and 410b connected to radio base station devices (hereinafter appropriately referred to as a NodeB) 420a and 420b, respectively, a radio access network 450 conforming to 3GPP (Third Generation Partnership Project), and a core network 480, as shown in FIG. 8. The "NodeB" is standardized as a logical node for wireless link for UE in a Cell.

The radio access network 450 comprises RNC (Radio Network Controller) 440a and 440b, and the NodeB 420a and 420b connected to the RNC 440a and 440b, respectively. The core network 480 includes an MSC (Mobile Switch Controller) 460 connected to the RNC 440a and 440b, and an HLR (Home Location Register) 470 connected to the MSC 460 (for example, refer to Non-Patent Document 1). Instead of the HLR, a VLR (Visitor Location Register) may be used.

The RNC 440a, 440b is a wireless controller. The NodeB 420a, 420b is a radio base station device. The MS 410a, 410b is a mobile station device. The MSC 460 is a mobile switch station. The HLR 470 is a subscriber information database.

Referring to FIG. 9, a communication procedure for the mobile communication system 400 configured in this way will be described below. In FIG. 9, the MS 410a existing in a wireless zone of the NodeB 420a is a communication source, and the MS 410b is a communication destination.

In FIG. 9, the MS 410a is connected via the NodeB 420a to the RNC 440a in starting the communication. Then, the MS 410a sends a call origination request to the RNC 440a (S401). The RNC 440a makes an inquiry of the MSC 460 about whether or not the communicating MS 410b is connectable (S402). The MSC 460 searches the HLR 470 and acquires the information on the MS 410b from the HLR 470 (S403).

The MSC 460 determines whether or not the RNC 440a is connectable to the communicating MS 410b via the NodeB 420b, RNC 440b and MSC 460 to which the MS 410b is connected, based on the acquired information about the MS 410b. If it is determined that the RNC 440a is connectable, the MSC 460 instructs the RNC 440a to connect to the MS 410b (S404). Also, the MSC 460 calls the MS 410b and receives a call response from the MS 410b (S405).

The RNC 440a, upon receiving an instruction, is firstly connected to the NodeB 420a (S406). Then, the MS 410a sends user data for the MS 410b to the NodeB 420a, and starts the communication (S407). Hence, a path C of the user data in the mobile communication system 400 is necessarily transmitted by way of the MSC 460, as shown in FIG. 10. That is, in the mobile communication system 400 as shown in FIG. 8, all the calls are processed through the MSC 460. Therefore, even if one mobile station of a communication destination and another communication source exist under the command of an identical radio base station device, the user data passed through a redundant path through the mobile switch station.

To shorten such a redundant path for the user data, there is a technique for extension transmission or reception of user data by providing an extension transmitting/receiving server in a radio access network 50 as shown in FIG. 11 (for example, refer to Patent Document 1). The technique for extension transmission or reception of user data will be described below.

A mobile communication system 100 includes the MS 10a and 10b, a radio access network 50, and a core network 80, as shown in FIG. 11. The radio access network 50 comprises the NodeB 20a, 20b, an extension transmitting/receiving server device 30, and the RNC 40a, 40b. The core network 80 includes an MSC 60 and an HLR 70.

The MS 10a and 10b are mobile station devices that perform wireless communication for transmitting or receiving data to or from the radio base station device by wireless. The MS 10a and 10b are connected to the NodeB 20a and 20b by wireless, respectively, and exist under the command of the NodeB 20a and 20b. In addition, the MS 10a and 10b, each transmits or receives the user data and control data to or from the NodeB 20a and 20b, respectively. Multiple MSs may be connected to one NodeB. Also, each MS 10a, 10b may perform both the transmission and reception of data, or either the transmission or reception of data. The radio access network 50 relays data between the core network 80 having the MSC 60 and the MS 10a, 10b.

The radio access network 50 relays data between the core network 80 and the MS 10a, 10b, with the use of the NodeB 20a, 20b and the RNC 40a, 40b.

The NodeB 20a and 20b are the radio base station devices that perform wireless communication for transmitting or receiving data to or from the MS 10a and 10b by wireless, respectively. The NodeB 20a and 20b are connected to the MS 10a and 10b by wireless, respectively. Also, the NodeB 20a and 20b are connected to the RNC 40a and 40b, respectively. Further, the NodeB 20a and 20b are connected to the extension transmitting/receiving server device 30. And the NodeB 20a and 20b, each transmits or receives the user data and control data to or from the MS 10a and 10b and the RNC 40a and 40b, respectively. The control data includes the mobile station control data transmitted or received between the MS 10a and 10b and the RNC 40a and 40b, and the control data regarding the extension transmission or reception (hereinafter referred to as the "extension transmission/reception control data"). Also, the NodeB 20a and 20b transmits or receives the user data to or from the extension transmitting/receiving server device 30. Multiple NodeBs may be connected to a single RNC. Also, Multiple extension transmitting/receiving servers may be connected to a single NodeB.

The extension transmitting/receiving server device 30 includes a NodeB interface 31, an RNC interface 32, a control signal processor 33, and a user data processor 34, as shown in FIG. 12. The NodeB interface 31 is a base station transmitting/receiving part for transmitting or receiving user data transmitted or received between MS 10a and MS 10b to or from the NodeB 20a and 20b by extension transmission or reception of data in the radio access network 50, respectively. The NodeB interface 31 transmits or receives the user data and extension transmission or reception control data to or from the NodeB 20a and NodeB 20b. The RNC interface 32 transmits or receives the extension transmission/reception control data to or from the RNCs 40a and 40b.

The control signal processor 33 processes the extension transmission/reception control data transmitted or received by the NodeB interface 31 and the RNC interface 32. For example, the control signal processor 33 acquires the extension transmission/reception control data received by the RNC interface 32 from the RNC interface 32. The control signal processor 33 controls the user data processor 34 based on the acquired extension transmission/reception control data. For example, when acquiring a notification of transmitting or receiving user data transmitted or received between MS 10a and MS 10b by extension transmission or reception, the control signal processor 33 instructs the user data processor 34 to transmit the user data, received from the NodeB 20a connected to the MS 10a, in which the MS 10a is the communication source and the MS 10b is the communication destination to the NodeB 20b connected to the MS 10b. Also, the control signal processor 33 instructs the user data processor 34 to transmit the user data, received from the NodeB 20b connected to the MS 10b, in which the MS 10b is the communication source and the MS 10a is the communication destination to the NodeB 20a connected to the MS 10a. In this way, the control signal processor 33 instructs the user data processor 34 to transmit or receive the user data by extension transmission or reception. Also, the control signal processor 33 generates the extension transmission/reception control data, and inputs it into the NodeB interface 31 or the RNC interface 32.

The user data processor 34 controls the transmission or reception of the user data in the NodeB interface 31. The user data processor 34 instructs the NodeB interface 31 to transmit the user data received from the NodeB 20a and 20b respectively connected to the MS 10a and 10b of communication source, to the NodeB 20b and 20a connected to the communicating MS 10b and 10a under the control of the control signal processor 33. More specifically, the user data processor 34 acquires the user data received from the NodeB interface 31.

The user data processor 34 decapsulates the acquired user data, if the user data is encapsulated at the IP address of the extension transmitting/receiving server device 30. The user data processor 34 acquires the identification information of identifying the communication source and the communication destination of user data after decapsulation. Also, the user data processor 34 inputs the user data after decapsulation into the NodeB interface 31. If the transmission destination IP address of user data is translated into the IP address of the extension transmitting/receiving server device 30, the user data processor 34 acquires the IP address of the communicating MS from the user data and inversely translates the acquired transmission destination IP address of user data into the IP address of the communicating MS. The user data processor 34 acquires the identification information for identifying the communication source and the communication destination of user data after inverse translation. Also, the user data processor 34 inputs the user data after inverse translation into the NodeB interface 31.

The user data processor 34 determines which NodeB should transmit the received user data based on the acquired identification information of the communication source and the communication destination of the user data and the instruction from the control signal processor 33. Then, the user data processor 34 directs the NodeB for transmitting the user data to the NodeB interface 31, based on the determination result. The identification information includes the IP address of the MS 10a, 10b, the user ID of the user who uses the MS 10a, 10b, and the mobile station ID, for example.

Referring to FIG. 13, a communication procedure using the mobile communication system 100 with the above configuration will be described below. Firstly, the MS 10a sends a call origination request for transmission of the user data for the MS 10b to the MSC 60 via the NodeB 20a and the RNC 40a (S101). The MSC 60 acquires the identification information of the NodeB 20a, 20b, to which the MS 10a of communication source and the communicating MS 10b are connected, respectively, as the subscriber information from the position registration information, with reference to the HLR 70 (S102). Thereby, the MSC 60 detects that the MSs 10a and 10b is connected to the NodeB 20a and 20b, respectively.

The MSC 60 references the extension transmitting or receiving server connection information of the NodeB 20a, 20b, based on the identification information of the NodeB 20a, 20b. Thereby, the MSC 60 detects that the NodeB 20a to which the MS 10a is connected is connected to the extension transmitting/receiving server device 30, and that the NodeB 20b to which the MS 10b is connected is connected to the extension transmitting/receiving server device 30. The MSC 60 judges that the user data is transmitted or received by the extension transmission or reception, because the extension transmitting/receiving server device 30 connected to the NodeB 20a, 20b exists. Then, the MSC 60 selects the extension transmitting/receiving server device 30 as the extension transmitting/receiving server to be used for the extension transmission or reception (S103).

Next, the MSC 60 instructs the RNC 40b to call the MS 10b (S104). The RNC 40b calls the MS 10b upon receiving the instruction, and then the MS 10b responds to the call (S105). The RNC 40b notifies the MSC 60 that the response to the call is received (S106). The MSC 60, upon receiving the call response, notifies the extension transmitting/receiving server device 30 that the user data to be transmitted or received between MS 10a and MS 10b is transmitted or received by the extension transmission or reception (S107). Further, the MSC 60 notifies the transmission or reception to be performed by extension transmission or reception and the IP address of the extension transmitting/receiving server device 30 used for the extension transmission or reception, to the NodeB 20b to which the communicating MS 10b is connected and the NodeB 20a to which the MS 10a of the communication source is connected (S108, S109).

Through the above process, the communication starts between MS 10a and MS 10b (S110). After the start of the communication, the MS 10a of communication source transmits the user data to the NodeB 20a (S111). The NodeB 20a transmits the received user data to the extension transmitting/receiving server device 30 by translating the transmission destination IP address of the user data received from the MS 10a into the IP address of the extension transmitting/receiving server device 30, or encapsulating the received user data at the IP address of the extension transmitting/receiving server device 30 (S112). The extension transmitting/receiving server device 30 transmits the received user data directly to the NodeB 20b by means of the extension transmission or reception by inversely transforming the transmission destination IP address of the user data received from the NodeB 20a into the IP address of the communicating MS 10b, or decapsulating the received user data (S113). At step (S113), the user data is transmitted or received without being passed through the RNC 40a, RNC 40b or the MSC 60. The NodeB 20b transmits the received user data to the MS 10b (S114).

Hence, the path A of the user data in transmitting or receiving the user data by the extension transmission or reception in the mobile communication system 100 is shown in FIG. 14. The user data is transmitted or received over the path A from the MS 10a, NodeB 20a, the extension transmitting/receiving server device 30, NodeB 20b to MS 10b, without passing through the MSC 60. That is, the NodeB 20a of the communication source connected to the MS 10a of the communication source receives the user data transmitted from the MS 10a of the communication source and then transmits the user data to the extension transmitting/receiving server device 30, without passing through the MSC 60, the extension transmitting/receiving server device 30 receives the user data from the NodeB 20a of communication source, and then transmits the user data to the communicating NodeB 20b connected to the communicating MS 10b. The communicating NodeB 20b receives the user data from the extension transmitting/receiving server device 30, and then transmits the user data to the communicating MS 10b. Hence, the data transmitted from the MS 10a of the communication source arrives at the communicating MS 10b by way of the path A in the radio access network 50.

After the start of the communication at step (S110), the NodeB 20a, 20b transmits or receives the mobile station control data transmitted or received between MS 10a and MS 10b via the MSC 60. Hence, the mobile station control data transmitted or received between MS 10a and MS 10b is transmitted or received via the MSC 60. That is, the mobile station control data is transmitted or received over the path from the MS 10a, NodeB 20a, RNC 40a, MSC 60, RNC 40b, NodeB 20b to MS 10b. It should be noted that the user data is transmitted over the path without passing through the core network, whereas the mobile station control data is transmitted over the path via the core network.

With the above communication procedure, it is possible to transmit or receive the user data by means of the extension transmission or reception between the NodeB 20a, 20b and the extension transmitting/receiving server device 30.

Therefore, in the mobile communication system 100, the user data can be transmitted or received, without being passed through the MSC 60 outside the radio access network 50.

Usually, the MSC 60 is often installed at a site away from the NodeB 20a, 20b to integrate the functions therein, whereas in the mobile communication system 100, the user data can be transmitted or received in the place near the NodeB 20a, 20b, because the MSC 60 is not passed through. Hence, in the mobile communication system 100, the path of user data is shortened as shown in FIG. 14. As a result, in the mobile communication system 100, the line charge can be reduced by the amount of a path via the MSC 60, and a delay on the path can be shortened. Also, several lines, required for all the user data to pass through such redundant paths including the MSC 60, are no longer needed.

Hence, in the mobile communication system 100, the extension transmission or reception and the transmission or reception via the MSC 60, or the extension transmitting/receiving server device 30 for use may be selectively used in a flexible manner in accordance with the situation of the mobile communication system 100 in transmitting or receiving the user data. Therefore, in the mobile communication system 100, it is possible to flexibly deal with a fault occurring in the extension transmitting/receiving server, for example.

Patent Document 1: JP No. 2004-364054 A

Non-Patent Document 1: "Wireless Broadband Textbook", supervised by Takeshi Hattori and Masanobu Fujioka, IDG Japan, Co. Ltd., Jun. 10, 2002, p. 26 to 37

DISCLOSURE OF THE INVENTION

Problems to be Solved by the Invention

Herein, the configuration of the mobile communication system as shown in FIG. 15 using a technique described in Patent Document 1 will be considered. As shown in FIG. 15, the NodeB is connected to a single extension transmitting/receiving server (hereinafter referred to as BS-DTM (Base Station-Data Transfer Module).

In FIG. 15, the user data is transferred in the order of the MS 10a, NodeB 20a, RNC 40a, MSC 60, RNC 40a, NodeB 20b and MS 10b during the normal communication without using the BS-DTM. That is, the user data is transmitted over a path C in FIG. 15.

On the other hand, the user data is transferred in the order of the MS 10a, NodeB 20a, BS-DTM 30, NodeB 20b and MS 10b in the communication using the BS-DTM, as shown in FIG. 16. That is, the user data is transmitted over a path B as shown in FIG. 16. Herein, a group is defined for the communication using the BS-DTM. In the case where the MSs belonging to the same group communicate within an area of the group, the extension call is enabled by using the BS-DTM covering the group. That is, the BS-DTM provided for the group is used.

FIG. 17 shows a processing flow for starting the extension call within the group. In FIG. 17, when a call is originated with an in-group extension call (S200), the station data stored in the HLR 70 is referenced by the RNC. In this example, since only one BS-DTM exists in an area of the in-group call, the BS-DTM number corresponding to one in-group area is uniquely decided by referring to the station data. Thus, the BS-DTM number to which the user belongs is retrieved (S202).

The NodeB is notified to transfer the user data to the BS-DTM with the retrieved BS-DTM number, and then a call set-up is made (S203). At the time of retrieving the BS-DTM number available in the area where the call is originated, it is unknown whether or not the BS-DTM can normally communicate. If a call set-up process is normally performed, an in-group telephone call is started (S204).

In a case where a call is originated in an area where an in-group communication is unavailable, or in a case where the BS-DTM cannot normally communicate, the call set-up process is abnormally ended, namely the call is disconnected (S205, S206).

It is possible to lighten the device load and the line load of the RNC or switch station during the communication using the BS-DTM, as compared with the communication without using the BS-DTM. The communication using the BS-DTM within the area where the BS-DTM is connected allows the cost of the line, the transmission line load and the connection delay to be reduced.

It should be noted that the line capacity of the BS-DTM has a certain limit. Accordingly, to realize the extension call with the number of lines beyond the limit, it is required to install another BS-DTM. In this case, multiple BS-DTMs are selectively used. The specific BS-DTM may be concentrically used unless the selection is appropriately controlled. Also, since the test of the line may be conducted using the operating BS-DTM, the selection of the BS-DTM is carefully controlled in consideration of this test. Further, it is necessary to control not to select the BS-DTM with a fault such as an intermittent fault or permanent fault.

This may cause a problem in a method for selecting from multiple BS-DTMs in an appropriate manner.

An object of the invention is to provide a mobile communication system, a wireless controller, and an extension transmitting/receiving server device selecting method for controlling the appropriate selection from the plurality of BS-DTMs.

Means for Solving the Problems

According to an aspect of the present invention, there is provided a mobile communication system including: a plurality of extension transmitting/receiving server devices, each transmitting or receiving user data to be transmitted or received between mobile station devices, by employing extension transmission or reception of data in a wireless access network relaying data between a core network having a mobile switch station and the mobile station devices; and a radio base station device that transmits or receives the user data to or from the extension transmitting/receiving server device; and server selecting means for selecting at least one of the plurality of extension transmitting/receiving server devices by referring to a management table for managing statuses of the plurality of extension transmitting/receiving server devices, wherein the user data is transmitted through the extension transmitting/receiving server device selected by the server selecting means. Thereby, it is possible to control the appropriate selection from the plurality of extension transmitting/receiving server devices.

In the above configuration provided the mobile communication system according to claim 1, wherein the management table includes, as an item of managing the status of the extension transmitting/receiving server device, at least one of information indicating the radio base station device for preferentially selecting the extension transmitting/receiving server device, information indicating whether or not the extension transmitting/receiving server device is in a suspended status or operating status, information indicating whether or not the extension transmitting/receiving server device is in a maintenance status, information indicating the result of a periodical health check regarding the extension transmitting/receiving server device, information indicating a loaded status of the extension transmitting/receiving server device, and information indicating whether or not the extension transmitting/receiving server device is tested. Thereby, it is possible to control the appropriate selection from the plurality of extension transmitting/receiving server devices by referring to the table including these items.

According to another aspect of the present invention, there is provided a wireless controller for use in a mobile communication system, the wireless controller including: a plurality of extension transmitting/receiving server devices that transmit or receive user data to be transmitted or received between mobile station devices, by employing extension transmission or reception of data in a radio access network relaying data between a core network having a mobile switch station and the mobile station devices; and a radio base station device that transmits or receives the user data to or from the extension transmitting/receiving server devices; and server selecting means for selecting at least one of the plurality of extension transmitting/receiving server devices, by referring to a management table for managing statuses of the plurality of extension transmitting/receiving server devices, wherein the user data is transmitted through the selected extension transmitting/receiving server device. Thereby, it is possible to control the appropriate selection from the plurality of extension transmitting/receiving server devices.

In the above configuration, the management table includes, as an item of managing the status of the extension transmitting/receiving server device, at least one of information indicating the radio base station device for preferentially selecting the extension transmitting/receiving server device, information indicating whether or not the extension transmitting/receiving server device is in a suspended status or an operating status, information indicating whether or not the extension transmitting/receiving server device is in a maintenance status, information indicating the result of a periodical health check regarding the extension transmitting/receiving server device, information indicating a loaded status of the extension transmitting/receiving server device, and information indicating whether or not the extension transmitting/receiving server device is tested. Thereby, it is possible to control the appropriate selection from the plurality of extension transmitting/receiving server devices by referring to the table including these items.

According to yet another aspect of the present invention, there is provided a method for selecting an extension transmitting/receiving server device that transmits or receives user data to be transmitted or received between mobile station devices to or from a radio base station device by extension transmission or reception of data in a radio access network relaying data between a core network having a mobile switch station and the mobile station devices, the method including: determining whether or not a call is originated from an extension call area where an extension call is available; selecting at least one extension transmitting/receiving server device belonging to the extension call area from which the call is originated by referring to a management table for managing the statuses of a plurality of extension transmitting/receiving server devices, if the call is originated from the area where the extension call is available; and performing a call set-up process using the selected extension transmitting/receiving server device, wherein the use data is transmitted to or received from a radio base station device, by employing extension or transmission of data in a radio access network relaying data between a core network having a mobile switch station and the mobile station devices. Thereby, it is possible to control the appropriate selection from the plurality of extension transmitting/receiving server devices.

This invention has the effect that it is possible to control the appropriate selection of an extension transmitting/receiving server device from the plurality of extension transmitting/receiving server devices by selecting at least one of them with reference to the management table for managing the statuses.

Also, it is possible to control the appropriate selection from the plurality of extension transmitting/receiving server devices by referring to the management table including at least one of information indicating the radio base station device for preferentially selecting the extension transmitting/receiving server device, information indicating whether or not the extension transmitting/receiving server device is in a suspended status or an operating status, information indicating whether or not the extension transmitting/receiving server device is in a maintenance status, information indicating the result of a periodical health check regarding the extension transmitting/receiving server device, information indicating a loaded status of the extension transmitting/receiving server device, and information indicating whether or not the extension transmitting/receiving server device is tested.

BRIEF DESCRIPTION OF THE DRAWINGS

FIG. 3 is a view showing a configuration example of a BS-DTM status management table;

FIGS. 6A and 6B are the view showing the variation of a use method for the BS-DTM, in which FIG. 6A is a schematic view showing an instance where one BS-DTM is provided within one company, and FIG. 6B is a schematic view showing an instance where a plurality of BS-DTMs are provided within one company;

FIGS. 7A and 7B are the view showing the variation of the use method for the BS-DTM, in which FIG. 7A is a schematic view showing an instance where one BS-DTM is shared by a plurality of companies, and FIG. 7B is a schematic view showing an instance where one extension group is configured for business establishments located at detached places in the same company;

Figure 1:
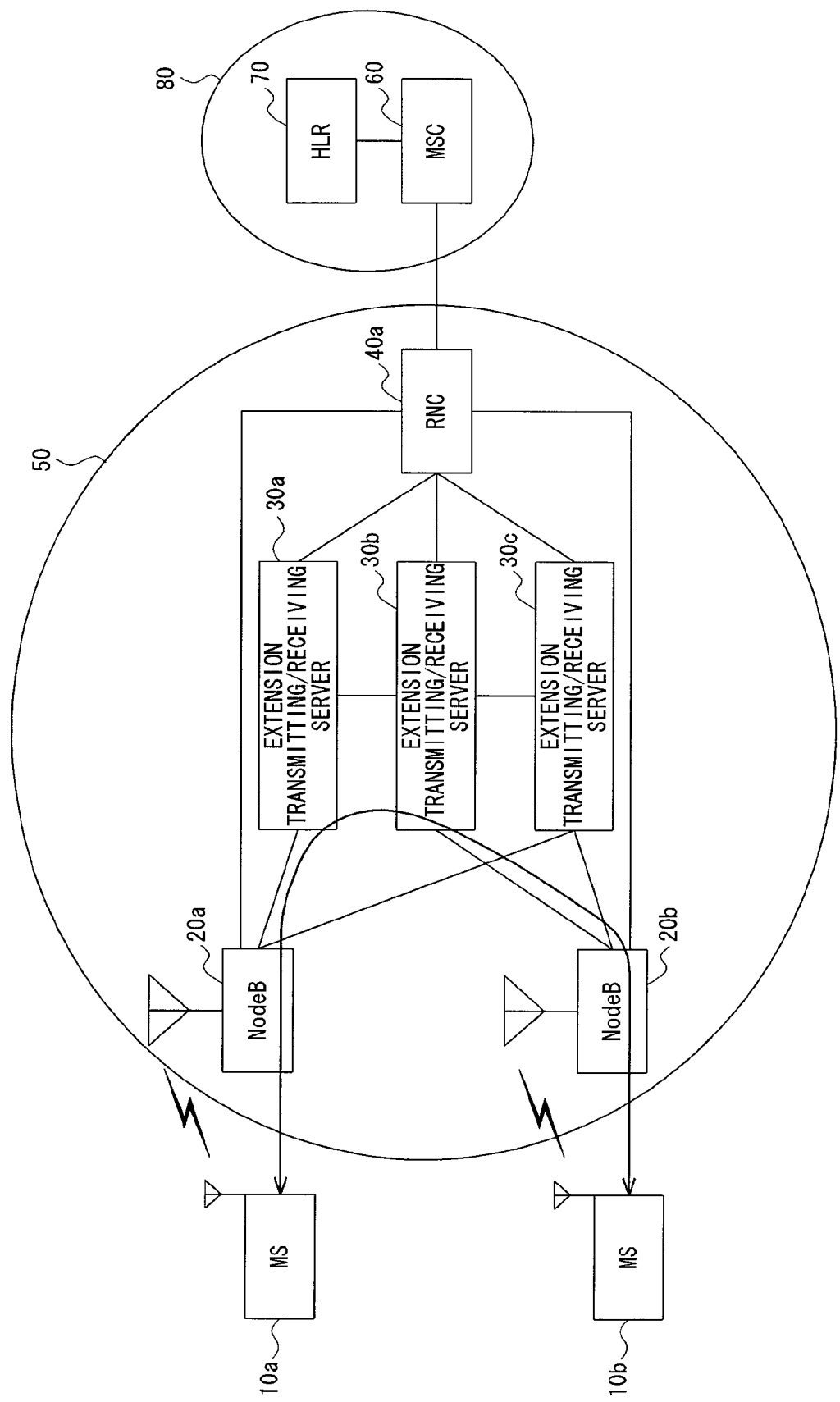
FIG. 1 is a diagram showing the configuration of a mobile communication system according to an embodiment of the present invention.

DESCRIPTION OF SYMBOLS 10a, 10b mobile station device
20a, 20b NodeB
30, 30a to 30c extension transmitting/receiving server device
31 NodeB interface
32 RNC interface
33 control signal processor
34 user data processor
40a, 40b RNC
41 BS-DTM selection functional part
42 BS-DTM status management part
43 call control part
44 interface part for NodeB and BS-DTM
50, 450 radio access network
60, 460 MSC
70, 470 HLR
80, 480 core network
90 BS-DTM status management table
100, 400 mobile communication system
Best Mode for Carrying Out the Invention The embodiments of the present invention will be described below with reference to the drawings. In the following, the same or like parts are designated by the same reference numerals throughout the drawings.

(System Configuration Example)

FIG. 1 is a block diagram showing the configuration of a mobile communication system according to an embodiment of the invention. Generally, there are a number of mobile wireless terminals, NodeB, BS-DTM and RNC in a network of mobile communication. To simplify the explanation, however, only the limited devices are described herein. Also, an MSC 60 may be arranged hierarchically, but is not described herein because the MSC is not related to the invention. Herein, an "extension call" as used in this specification means that user data is transmitted or received without passing through a core network under the control of at least one BS-DTM provided in a radio access network, so as to realize speech communication, the videophone, the data communication and other communications between the mobile station devices performing radio communications.

In FIG. 1, in the mobile communication system according to the present embodiment, three BS-DTMs are employed in the radio access network 50. In addition, according to the present embodiment, it is assumed that the MS 10a and the MS 10b belong to the same group, and the extension call using the BS-DTM is made possible in a call area provided by the NodeB 20a and the NodeB 20b. Herein, an in-group call area is defined as an area covered by the NodeB 20a and the NodeB 20b. Also, an in-group telephone call is defined to be a call between the MSs (mobile stations) belonging to the same group using the BS-DTM within the in-group call area.

The user data at the time of the in-group telephone call is transferred in the order of the MS 10a, NodeB 20a, BS-DTM 30a, BS-DTM 30b, NodeB 20b and MS 10b. Herein, with reference to FIG. 1, a description will be given of a case where a BS-DTM transmitting to or receiving from an MS on a transmitting side is different from a BS-DTM transmitting to or receiving from an MS on a receiving side. However, depending on the system configuration, a BS-DTM transmitting to or receiving from an MS on a transmitting side may be identical to a BS-DTM transmitting to or receiving from an MS on a receiving side.

An HLR 70 within a core network 80 stores an extension group ID to which the MS of a user belongs and information for identifying the MS of the user (telephone number, IMSI (International Mobile Subscriber Identity)), as information necessary to make an extension call using the BS-DTM. Various other pieces of information are managed in the HLR.

In an RNC 40a, a file called station data is stored. This station data includes information on a node connected to each station and information on a related in-group call area. The RNC 40a makes a call set-up process by referring to this station data, as needed. This call set-up process is a process for making the communication ready by notifying a destination IP address and a port number. That is, in the case where the BS-DTM, NodeB and RNC are connected in an IP network, for example, the RNC determines which NodeB and which BS-DTM the user data should be transferred between. The RNC notifies the NodeB of the destination IP address and the port number of the BS-DTM that transfers the user data, and notifies the BS-DTM of the destination IP address and the port number of the NodeB that transfers the user data. This allows the BS-DTM and the NodeB to transmit the data to the destination for transferring the user data notified from the RNC. The process for making the communication ready by notifying the destination IP address and the port number is the call set-up process.

In the present embodiment, at least the NodeB number, the BS-DTM number, and the in-group call area number, which are stored in the RNC, are set as the station data.

(In-Group Telephone Call Processing Flow)

Figure 2:
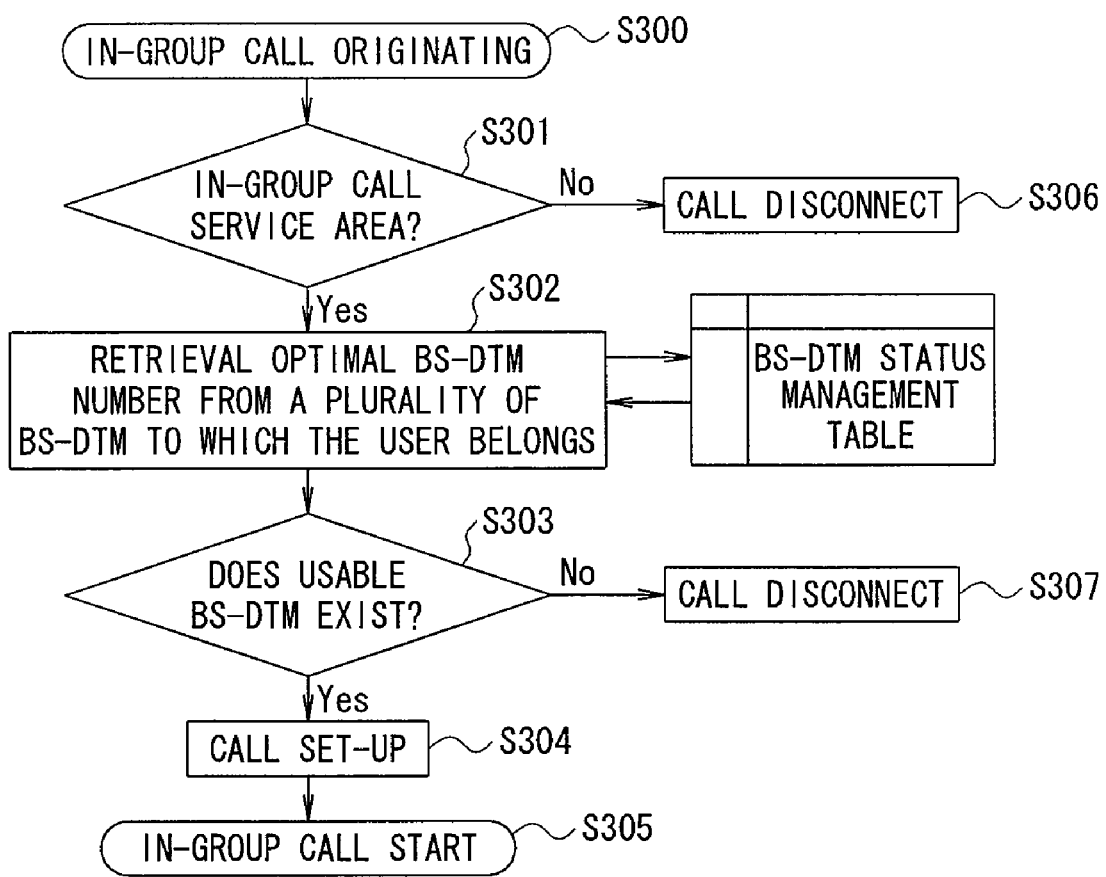
FIG. 2 is a flowchart showing a processing flow for starting the extension call in the invention.

FIG. 2 is a flowchart showing a processing flow for starting the in-group telephone call in the present system. According to the present embodiment, multiple BS-DTMs exist in a single in-group call area. The RNC has a table for managing the status of the BS-DTM (hereinafter, a BS-DTM status management table) included. In originating a call, an in-group telephone call is identified by adding four-digit numbers before the general telephone number (the number beginning with 090, for example).

In FIG. 2, when a call is originated with the in-group telephone call (step S300), the RNC performs a BS-DTM selection process. The RNC firstly determines whether or not the call is originated from the area where the in-group telephone call (i.e., extension call) is available, by referring to the station data (step S301). If the call is originated from the area where the in-group telephone call is available, the RNC retrieves the BS-DTM number belonging to the in-group call area where the call is originated, by referring to the station data (step S302). Herein, multiple BS-DTM numbers are retrieved by the RNC.

Then, the RNC refers to the BS-DTM status management table, and determines whether or not there is a BS-DTM is communicable and available (step S303). The RNC performs a call set-up process (step S304), when the optimal BS-DTM is determined. Thereby, the in-group telephone call is started (step S305).

In a case where the in-group telephone call is not available or there is no BS-DTM available, the call set-up process is abnormally ended, that is, the call is disconnected (steps S306, S307).

(Status Management Table)

FIG. 3 is a view showing a configuration example of the BS-DTM status management table according to the present embodiment. In the BS-DTM status management table 90, multiple statuses are managed. The statuses shown in FIG. 3 will be discussed later.

In FIG. 3, the management items of the BS-DTM status management table 90 include the status temporarily set by an operator, the status determined by the station data setting, and the status dynamically changing and detected by the RNC. The optimal BS-DTM is selected from among the communicable BS-DTMs by retrieving these statuses.

In FIG. 3, the "representative NodeB number" is the number given to a single BS-DTM, as a representative, to be set in the BS-DTM status management table, in the case where multiple NodeBs and multiple BS-DTMs exist in a single in-group call area. For each BS-DTM number, the representative NodeB number is set. Herein, it is supposed that the representative BS-DTM of the NodeB 20*a* be BS-DTM 30*a*, and the representative BS-DTM of the NodeB 20*b* be BS-DTM 30*b*.

Therefore, for the BS-DTM used in an in-group telephone call originated from the NodeB 20*a*, the first candidate is the BS-DTM 30*a* that is the representative BS-DTM, for example. Accordingly, if any other status set in the BS-DTM status management table is suitable for the concerned call, communication is made by using the BS-DTM 30*a* that is the representative BS-DTM. Setting of a different representative BS-DTM for each NodeB allows the load applied on the BS-DTM to be distributed.

In FIG. 3, the "suspended" status means that an operator is able to temporarily set remotely. If there is a suspicion of a trouble, or if the concerned BS-DTM is temporarily disabled before starting its service, the "suspended" status can be set. If a BS-DTM selection process is performed, the BS-DTM in the "suspended" status is not selected by referring to the BS-DTM status management table.

In FIG. 3, the "maintenance" status means that an operator can temporarily set remotely. An operator is able to make special settings for distinguishing between the maintenance mode and the general mode on a mobile station. The mode of the mobile station is registered in the HLR within the core network, and is notified via the MSC to the RNC for each call. The telephone call of a general user is made using the BS-DTM operating in the "operating" status, or in the operating mode. On the contrary, if the operator sets the BS-DTM in the "maintenance" status, the BS-DTM is selected only when the call is originated from the mobile station operating in the maintenance mode. Accordingly, if a general user originates a call, the optimal BS-DTM is selected from among the BS-DTMs except for the BS-DTM operating in the maintenance mode.

For example, when a new BS-DTM is installed, its normality is generally verified in the maintenance mode. If no problem is recognized with the normality verification, the mode is changed to the operating mode. Rewriting of the status in this way enables the operation to be performed without disturbing the telephone call of a general user. Also, in the case where there is a trouble suspected in the BS-DTM, the setting is changed from the operating mode to the maintenance mode, thereby allowing an investigation work for determining the cause to be conducted without affecting the communication of the general user.

In FIG. 3, the "health check" is an item for managing the communicability with the BS-DTM. That is, the RNC periodically makes the health check of the BS-DTM to confirm the status of the BS-DTM. Then, the result of the health check is set in this item. If the health check OK is set, the transmission line between the RNC and the BS-DTM and the status of the BS-DTM are normal, whereby the communication is available.

On the other hand, if the health check NG is set, the transmission line or the BS-DTM is somewhat abnormal, whereby the communication is not available. Accordingly, the BS-DTM with the health check NG is not selected as the optimal BS-DTM.

In FIG. 3, the "load" is an item for managing the load status of the BS-DTM. That is, the RNC periodically acquires the load status of the BS-DTM, and manages it. The BS-DTM with a smaller load is preferentially selected to avoid a load applied only on a specific BS-DTM.

In FIG. 3, the "test registration" is an item for managing whether or not there is a special test setting made by an operator for the BS-DTM. This item is registered as "present" or "absent" for the "test registration". The operator is able to make the test registration remotely in the RNC, NodeB, BS-DTM and MS. For a call originated from the MS subject to the test registration, the BS-DTM subject to the test registration is preferentially selected. This makes it possible to check the operation of a specific device selected by an operator. A general user is able to use the BS-DTM that is registered with the "test registration" with "present".

As described heretofore, multiple statuses are managed by the BS-DTM status management table, and in addition, the RNC is capable of retrieving all the management statuses, thereby permitting the optimal BS-DTM to be selected and controlling the call with the selected BS-DTM.

The BS-DTM status management table does not have to include all the items in FIG. 3, but may include any item as long as the BS-DTM status management table includes only items to be managed. That is, this management table may include, as an item for managing the status of the extension transmitting/receiving server device, at least one of information indicating the radio base station device for preferentially selecting the extension transmitting/receiving server device, information indicating whether or not the extension transmitting/receiving server device is in the suspended status or operating status, information indicating whether or not the extension transmitting/receiving server device is in the maintenance status, information indicating the result of periodical health check on the extension transmitting/receiving server device, information indicating the load status of the extension transmitting/receiving server device, and information indicating whether or not the extension transmitting/receiving server device is tested.

(RNC Configuration Example)

Figure 4:
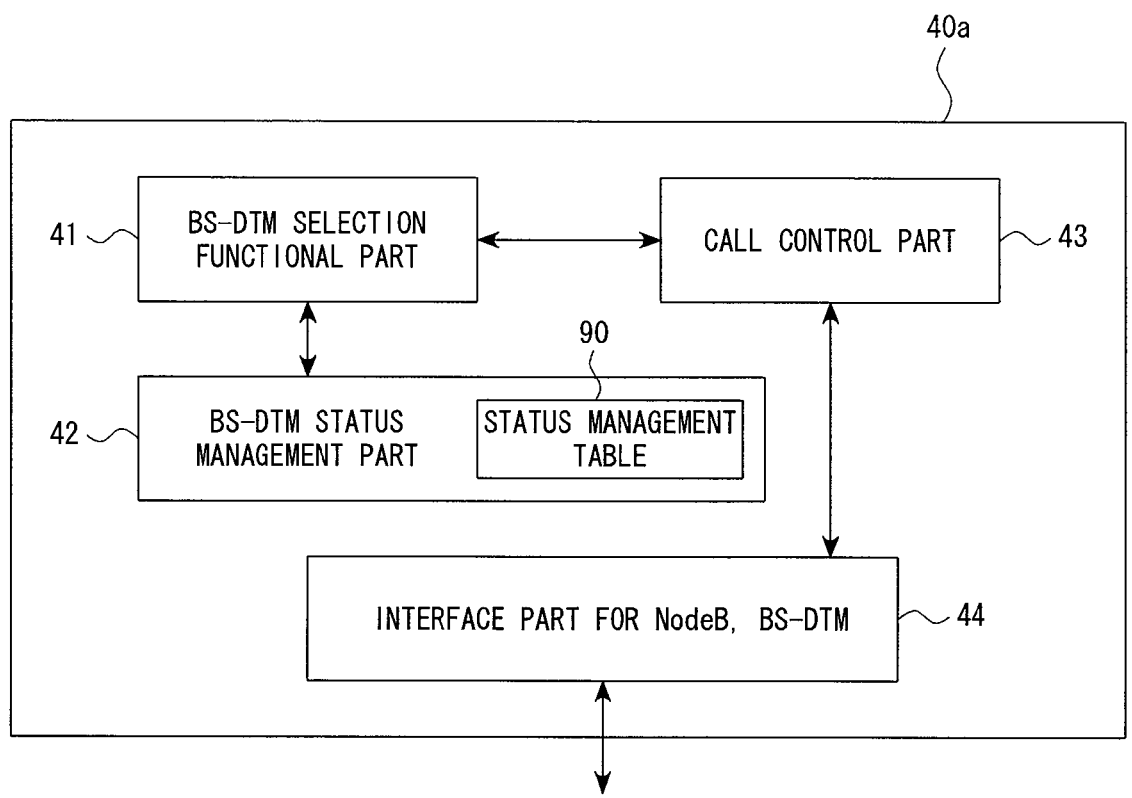
FIG. 4 is a block diagram showing a configuration example of the RNC in FIG. 1.

FIG. 4 is a block diagram showing a configuration example of the RNC in FIG. 1. In FIG. 4, the RNC includes: a BS-DTM selection functional part 41 that performs a process for selecting the BS-DTM for use in the communication; a BS-DTM status management part 42 that holds and manages the BS-DTM status management table 90; a call control part 43 that monitors an occurrence of an in-group telephone call; and an interface part 44, for NodeB and BS-DTM, for interfacing with the NodeB and BS-DTM.

The call control part 43 notifies the BS-DTM selection functional part 41 of the in-group call area to which the call belongs, when an in-group telephone call occurs. The BS-DTM selection functional part 41 refers to the BS-DTM status management table held in the BS-DTM status management part 42. Then, the BS-DTM selection functional part 41 determines which BS-DTM in the in-group call area to be selected, and notifies the result to the call control part 43. The call control part 43 performs the call set-up process to enable the BS-DTM notified from the BS-DTM selection functional part 41 and the NodeB to transfer the user data, which is the data to be exchanged via a U-plane.

Although the BS-DTM status management part 42 that holds and manages the BS-DTM status management table 90 and the BS-DTM selection functional part 41 are provided within the RNC according to the present embodiment, the invention is not limited to this configuration. That is, the radio access network may be provided with a device for BS-DTM selection having the BS-DTM status management part 42 and the BS-DTM selection functional part 41. For example, the above configuration may be added to a device in an IMCS (registered trademark) (Inbuilding Mobile Communication System).

(Table Retrieval Process Example)

Figure 5:
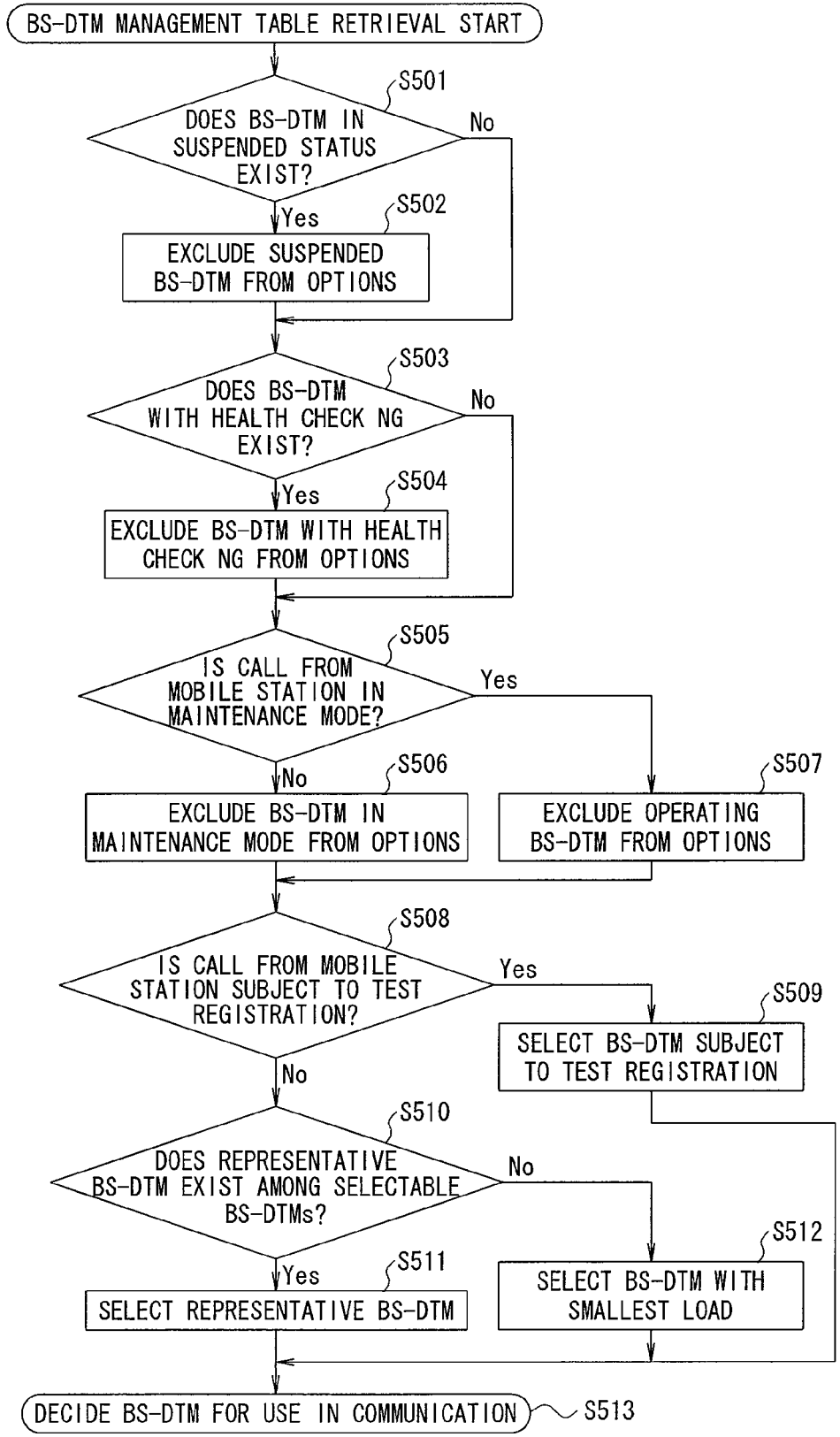
FIG. 5 is a flowchart showing an example of a retrieval process for the BS-DTM status management table.

FIG. 5 is a flowchart showing an example of a retrieval process for the BS-DTM status management table in the system. In the retrieval process for the BS-DTM status management table, priorities are given to the statuses managed by the BS-DTM status management table, so the table is retrieved in the order of the priorities.

In this example, a higher priority is set in the order of the suspended status, health check, maintenance mode, test registration, representative BS-DTM and load. In fact, the priority order is not limited to this, but the order of the priorities may be changed in accordance with the management items of the BS-DTM status management table.

In FIG. 5, it is firstly determined whether or not the BS-DTM in the suspended status exists (step S501). If the BS-DTM in the suspended status exists, the BS-DTM is excluded from the alternatives (step S502).

Next, it is determined whether or not the BS-DTM with the health check NG exists (step S503). If the BS-DTM with the health check NG exists, the BS-DTM is excluded from the alternatives (step S504).

In addition, it is determined whether or not the call is originated from the MS set in the maintenance mode (step S505). If the call is not originated from the MS set in the maintenance mode, the BS-DTM set in the maintenance mode is excluded from the alternatives (step S506). Conversely, if the call is originated from the MS set in the maintenance mode, the BS-DTM set in the operating mode is excluded from the alternatives (step S507).

Next, it is determined whether or not the call is originated from the MS subject to test registration (step S508). If the call is originated from the MS subject to test registration, the BS-DTM subject to test registration is selected (step S509).

Further, as a result of the above retrieval process, it is determined whether or not there is the representative BS-DTM in the selectable BS-DTMs (step S510). If the representative BS-DTM exists, the representative BS-DTM is selected (step S511). Conversely, if the representative BS-DTM does not exist, the BS-DTM with a smallest load is selected (step S512). Through the above retrieval process, the BS-DTM to be used for the communication is determined (step S513).

By retrieving in the above way, it is made possible to control the selection in an appropriate manner from multiple extension transmitting/receiving server devices.

(Group Registration Variation)

It should be noted that several variations can be considered for registering the group for the in-group telephone call. For example, the group registration variations of (1) to (4) can be considered as follows:

(1) All the MSs belong to a single extension group;
(2) A single MS belongs to multiple extension groups;
(3) A single BS-DTM has a single extension group; and
(4) A single BS-DTM has multiple extension groups.

The following application examples can be considered in the above pattern registration.

For example, a large company has multiple extension groups. For example, each division has a different extension group. A member, who is made to make an extension call within the same division only, is registered to belong to only one group Another member, who is made to to make an extension call with members in two or more divisions, is registered to belong to multiple groups.

Also, members in multiple companies may be registered to belong to a single extension group. For example, Company A and Company B, which frequently make telephone calls on business, jointly make a single extension group by contract, and register users in the extension group. Thereby, the extension call is allowed between Company A and Company B, within Company A, and within Company B, respectively.

Multiple companies may be registered to share a single BS-DTM. For example, Company A and Company B respectively make a contract for different extension groups A and B, but share an identical BS-DTM. In this case, any extension call between Company A and Company B is not available. This will be described later with reference to FIG. 7A.

(BS-DTM use Method Variation)

It should be noted that several variations for using the BS-DTM can be considered. FIGS. 6A through 7B are views showing the variations of the method for using the BS-DTM.

Figure 6A:
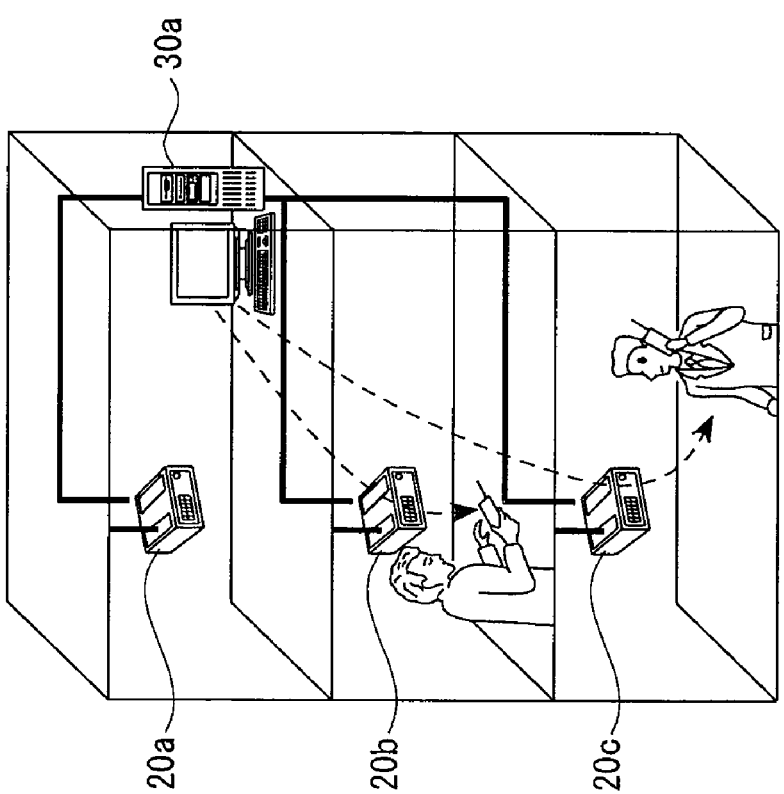

FIG. 6A is a schematic view showing an instance where a single BS-DTM is provided within a company. Referring to FIG. 6A, the BS-DTM 30a is provided on the third floor of a three-story building. Three NodeBs 20a, 20b and 20c are connected to the BS-DTM 30a. The NodeB 20a is provided on the third floor, the NodeB 20b is provided on the second floor, and the NodeB 20c is provided on the first floor. In this method, an extension call is allowed anywhere within the company that occupies the three-story building by providing a single BS-DTM 30a. For example, the extension call can be made between a person on the second floor and another person on the first floor, through the NodeB 20b, BS-DTM 30a and NodeB 20c in this order, as indicated by the broken line in FIG. 6A.

Figure 6B:
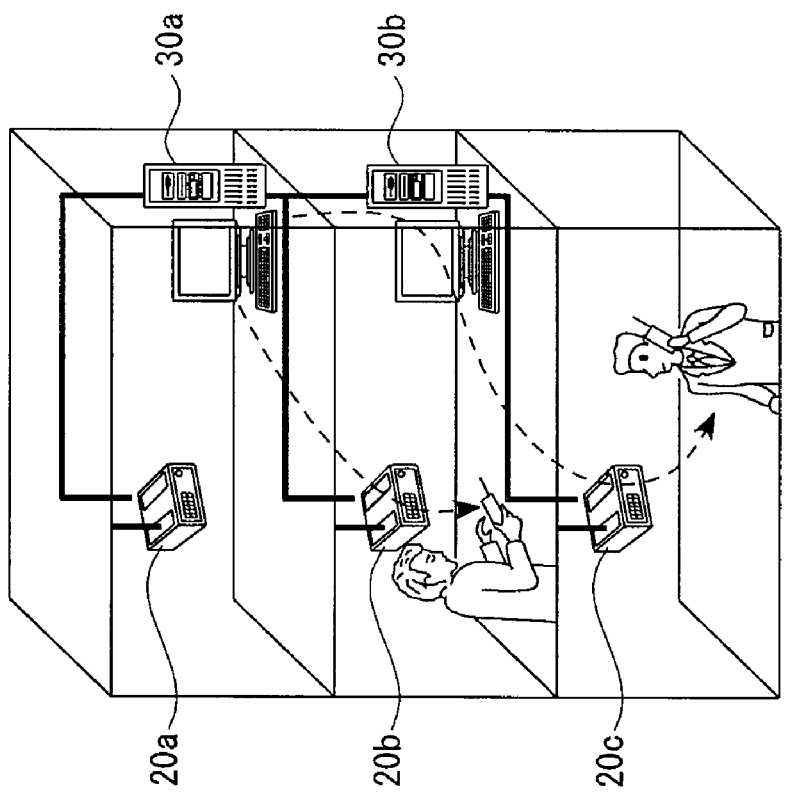
Figure 8:
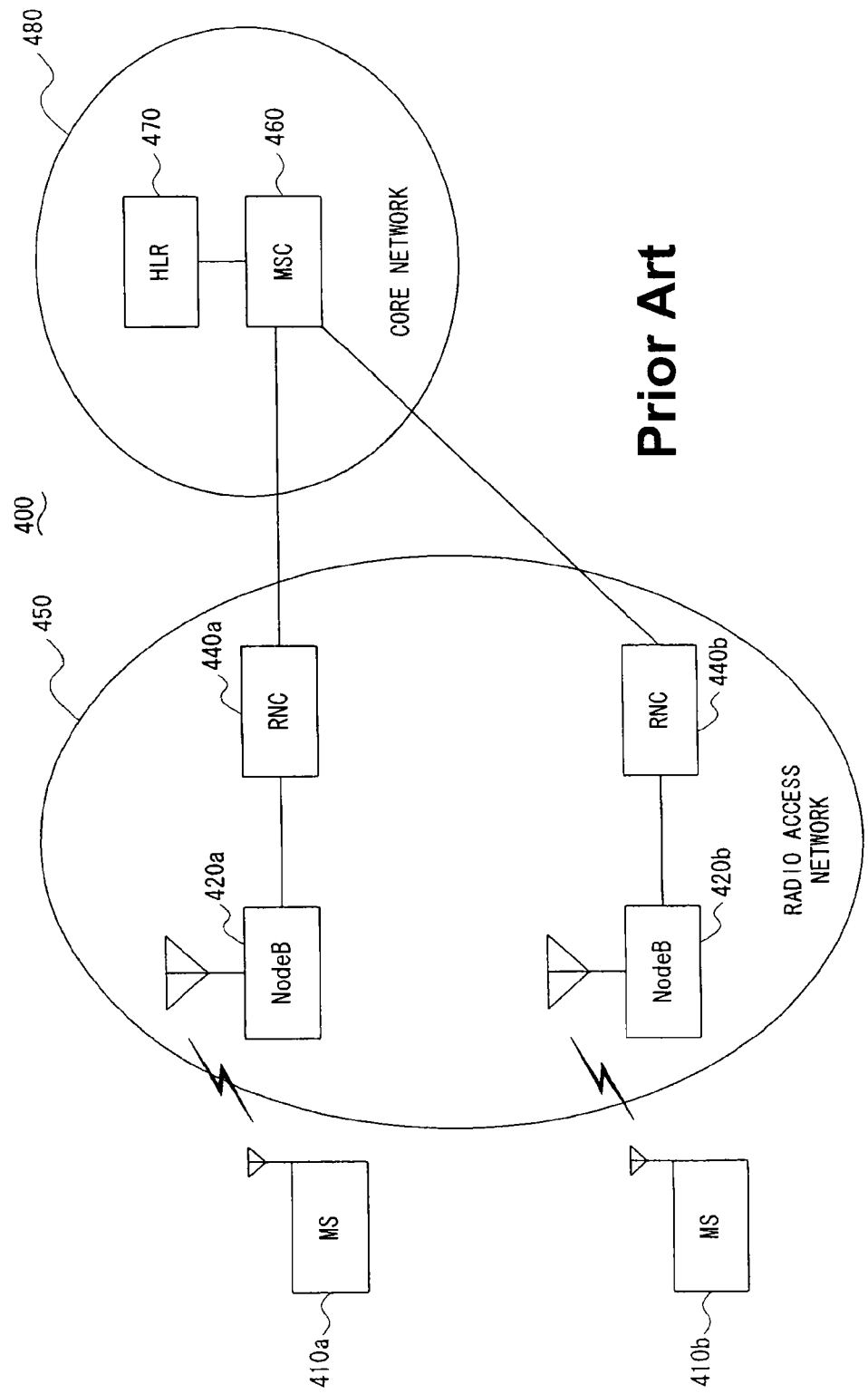
FIG. 8 is a view showing a configuration example of the typical mobile communication system.
Figure 9:
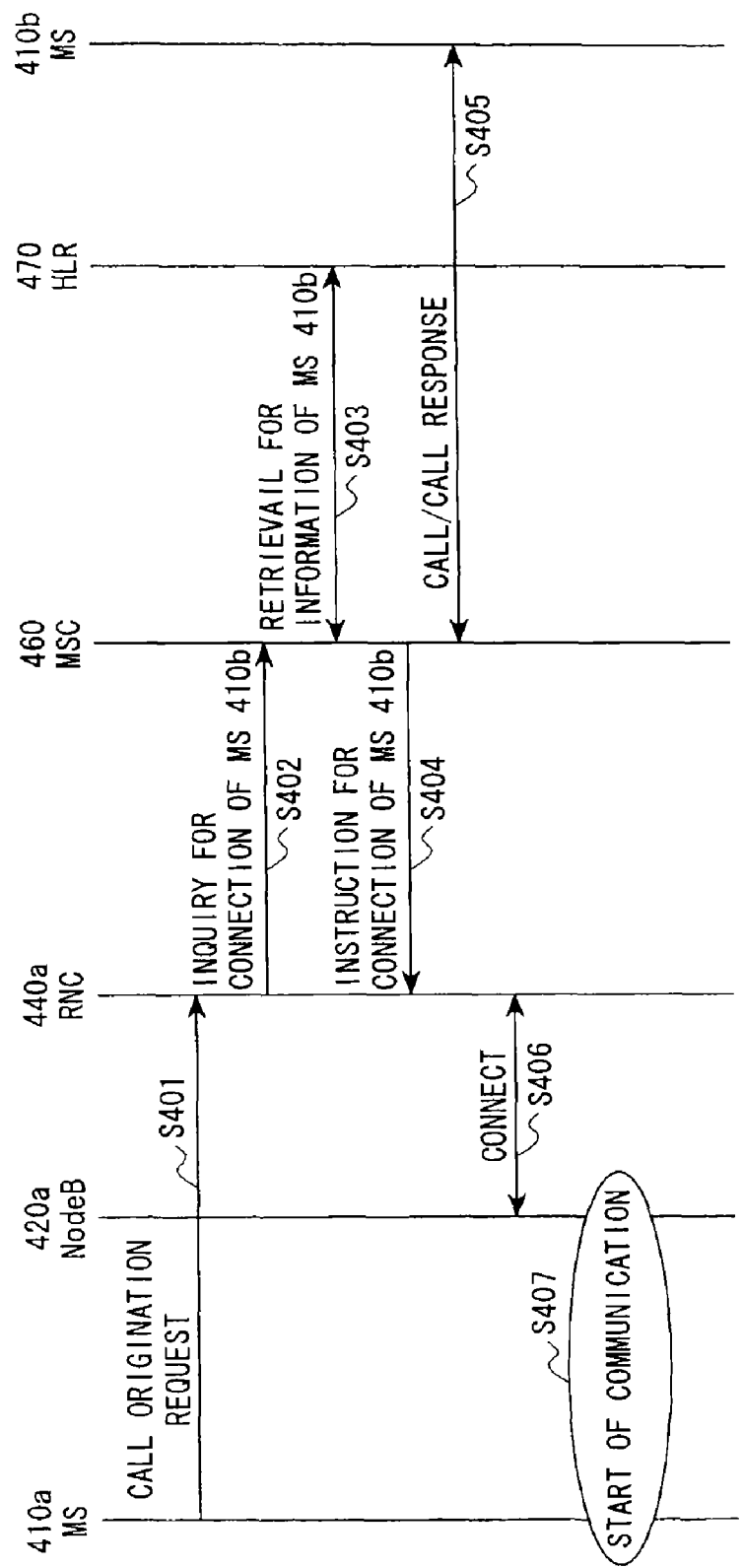
FIG. 9 is a sequence chart showing a communication procedure using the mobile communication system of FIG. 8.
Figure 10:
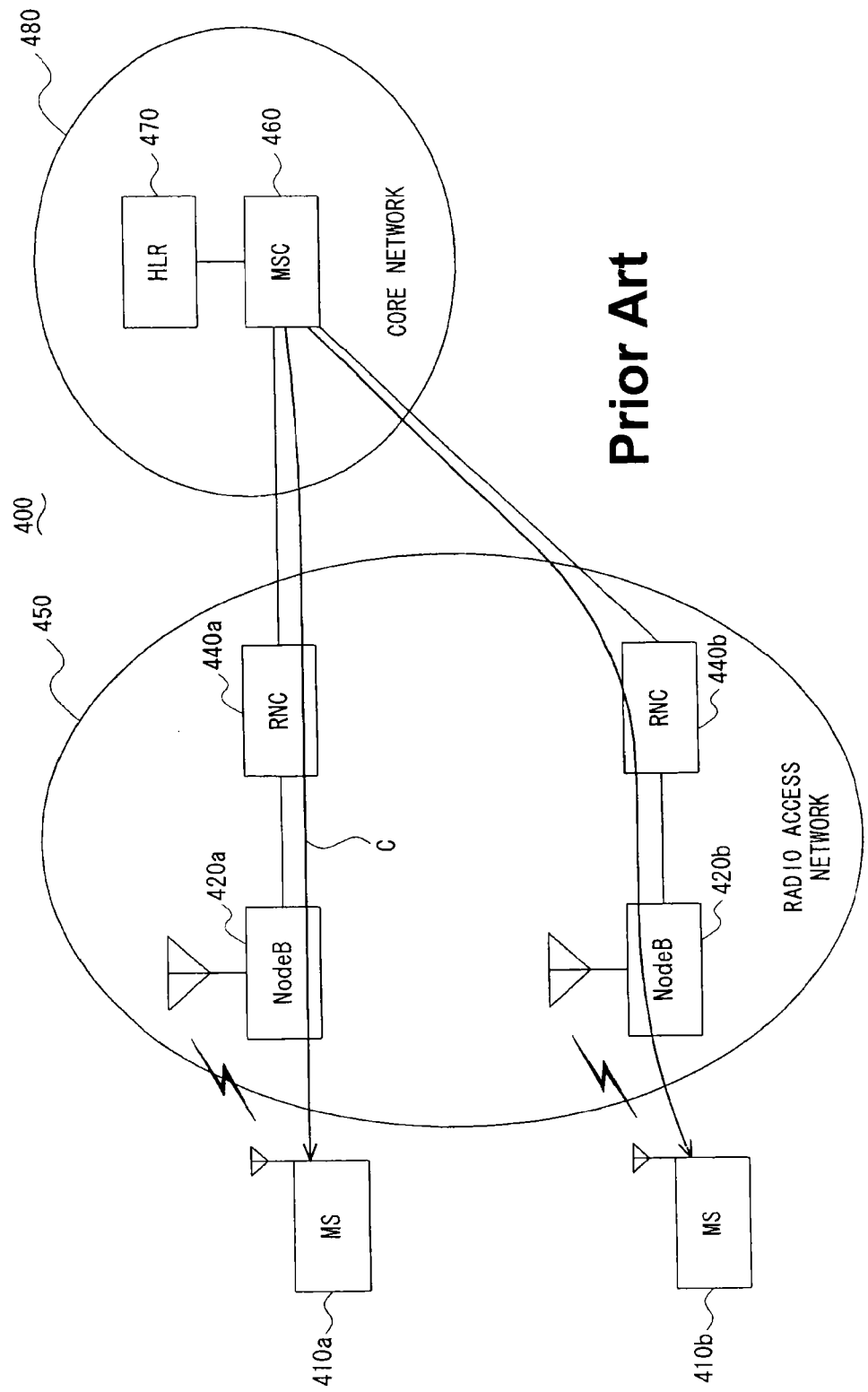
FIG. 10 is a view showing the path of user data in transmitting or receiving the user data in the conventional mobile communication system.
Figure 11:
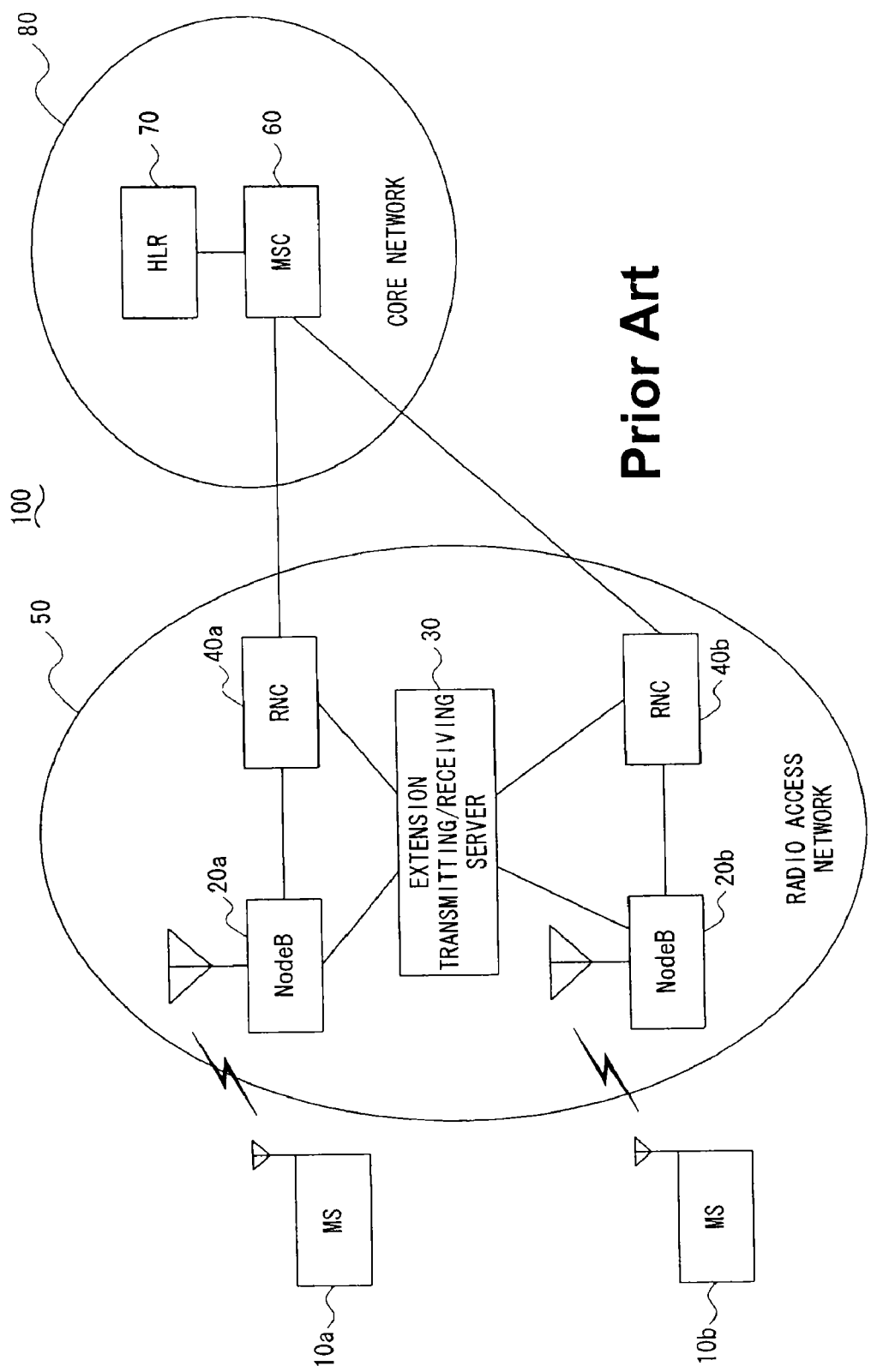
FIG. 11 is a view showing a configuration for shortening the redundant path for user data.
Figure 12:
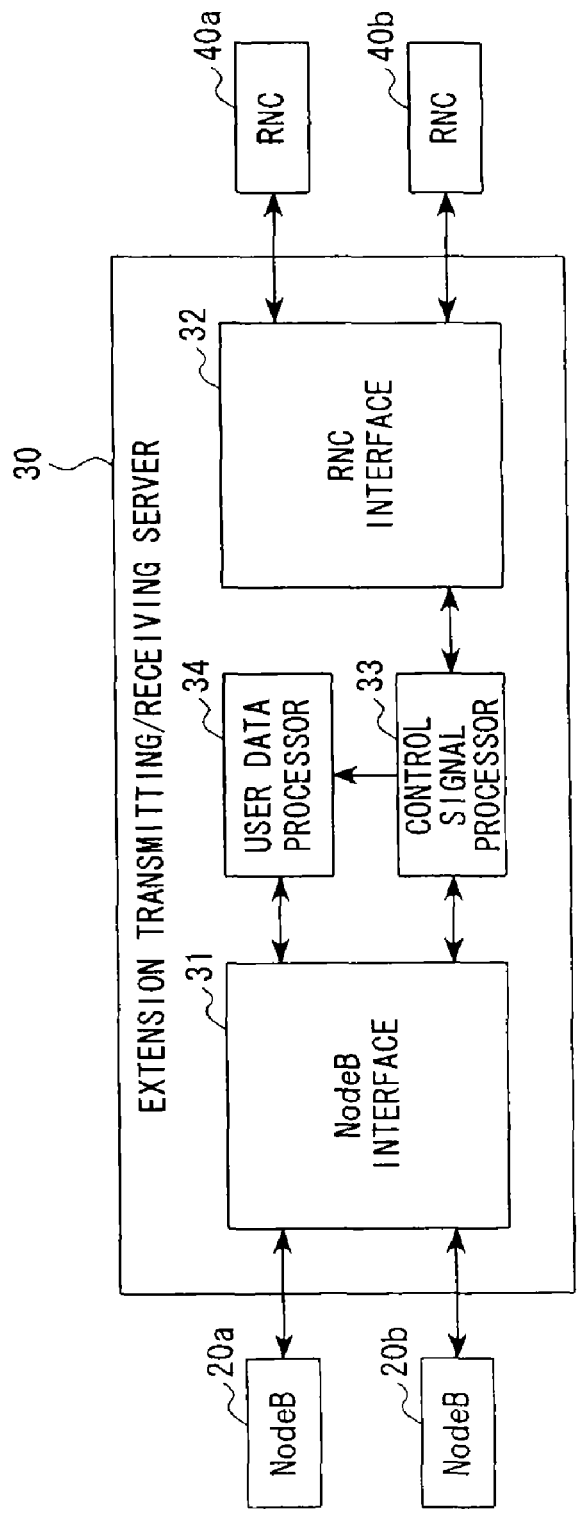
FIG. 12 is a block diagram showing a configuration example of the extension transmitting/receiving server.
Figure 13:
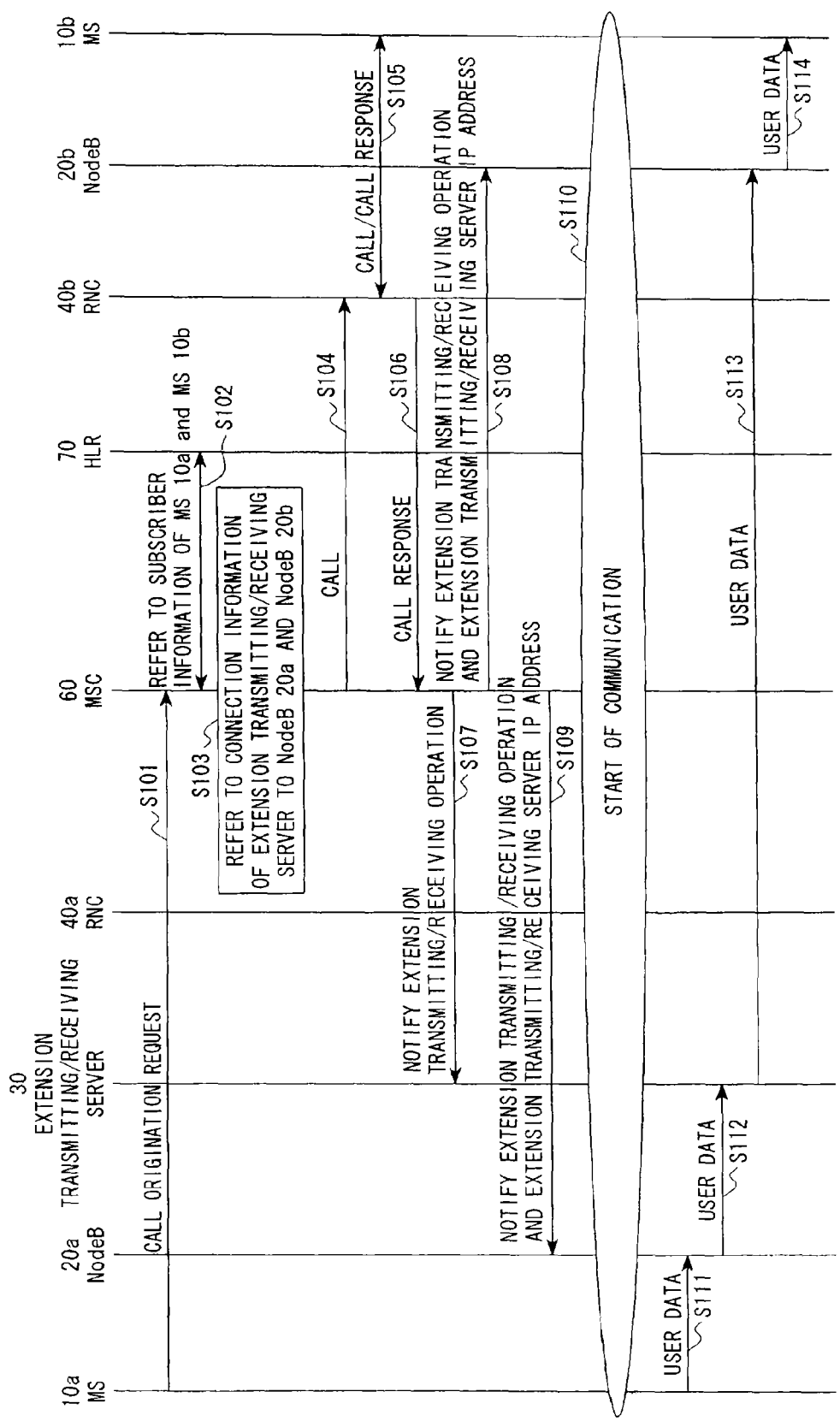
FIG. 13 is a sequence chart showing a communication procedure using the conventional mobile communication system.
Figure 14:
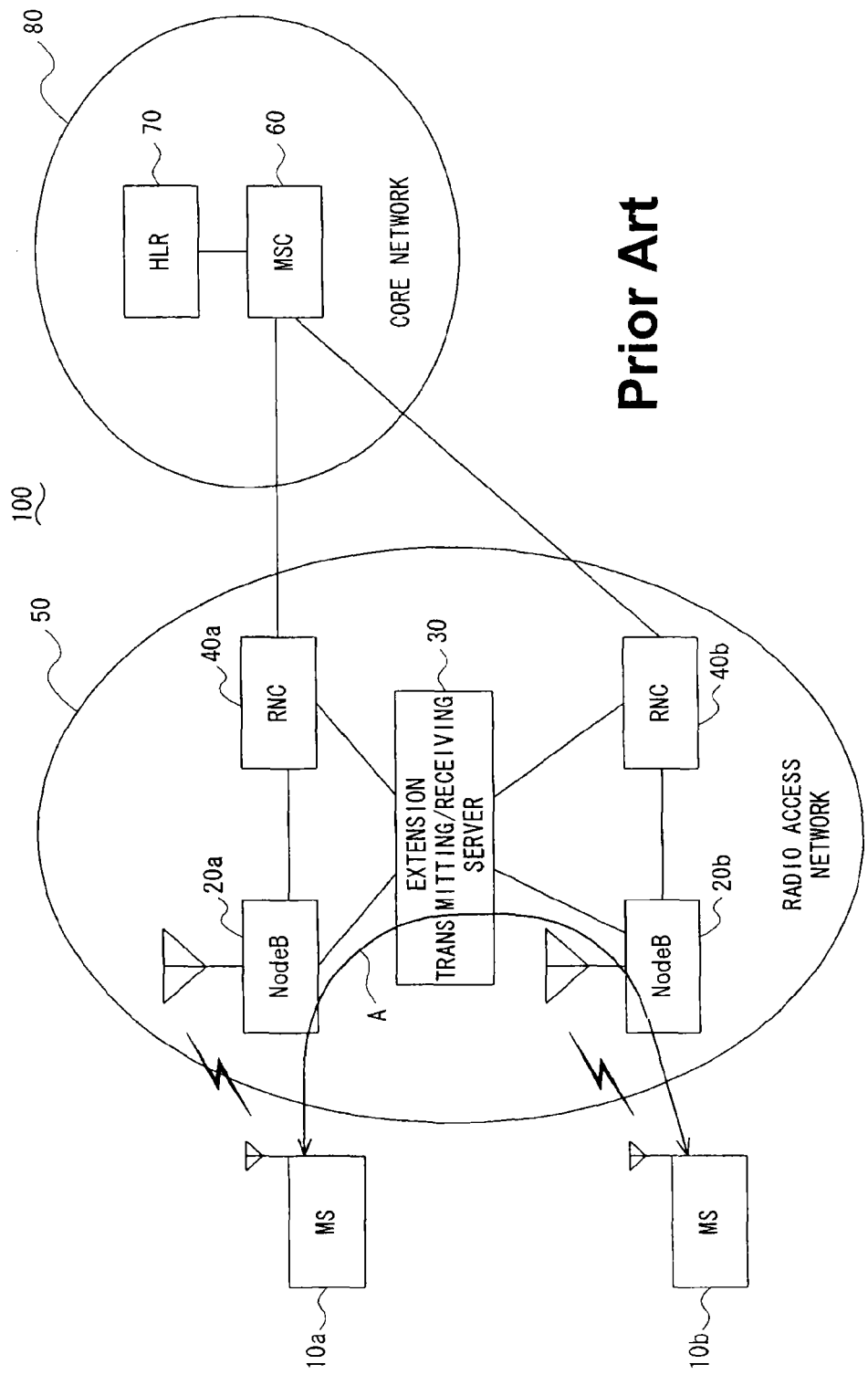
FIG. 14 is a view showing the path for user data in transmitting or receiving the user data by extension transmission or reception in the conventional mobile communication system using the extension transmitting/receiving server.
Figure 15:
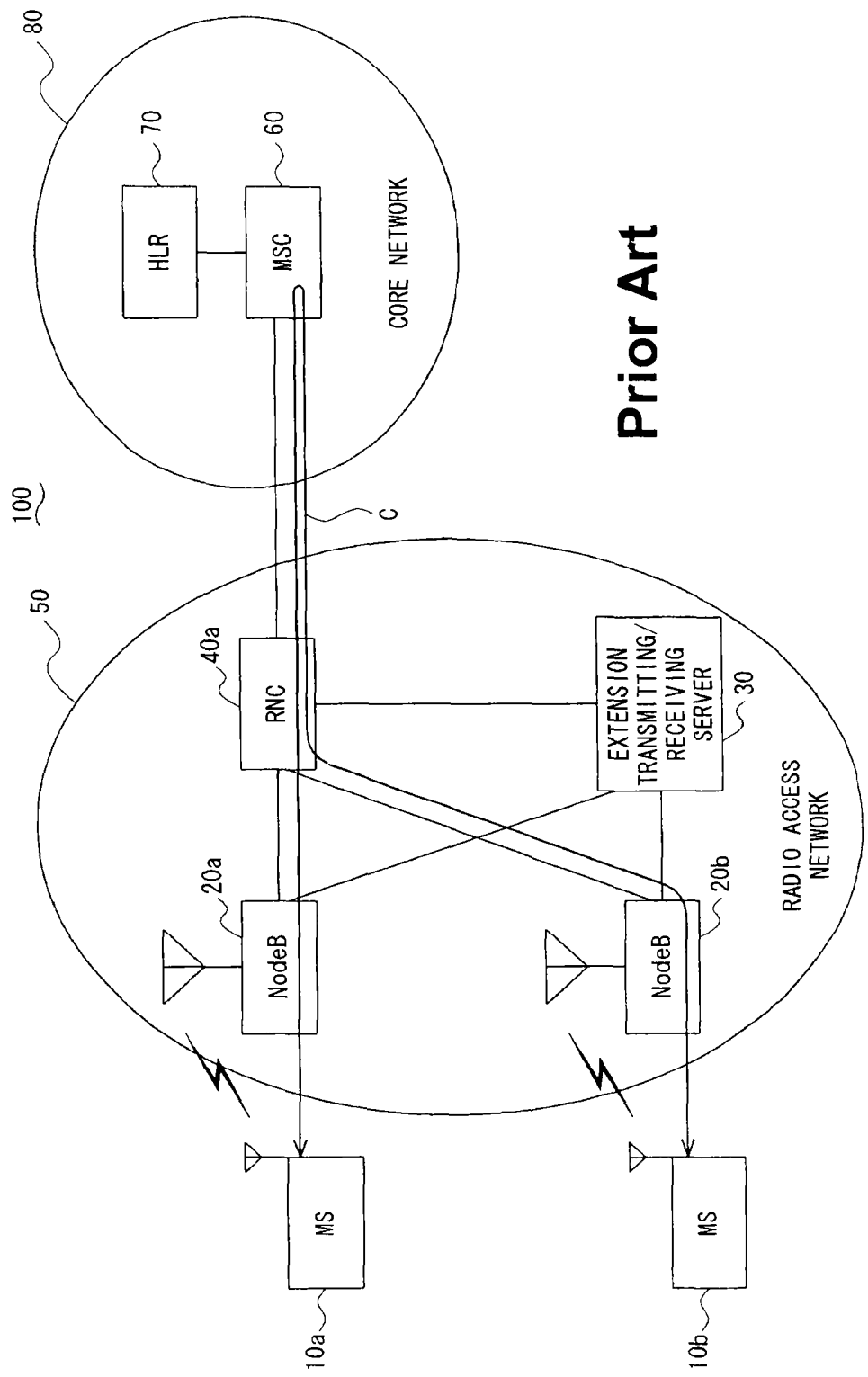
FIG. 15 is a view showing the configuration of the conventional mobile communication system using the extension transmitting/receiving server.
Figure 16:
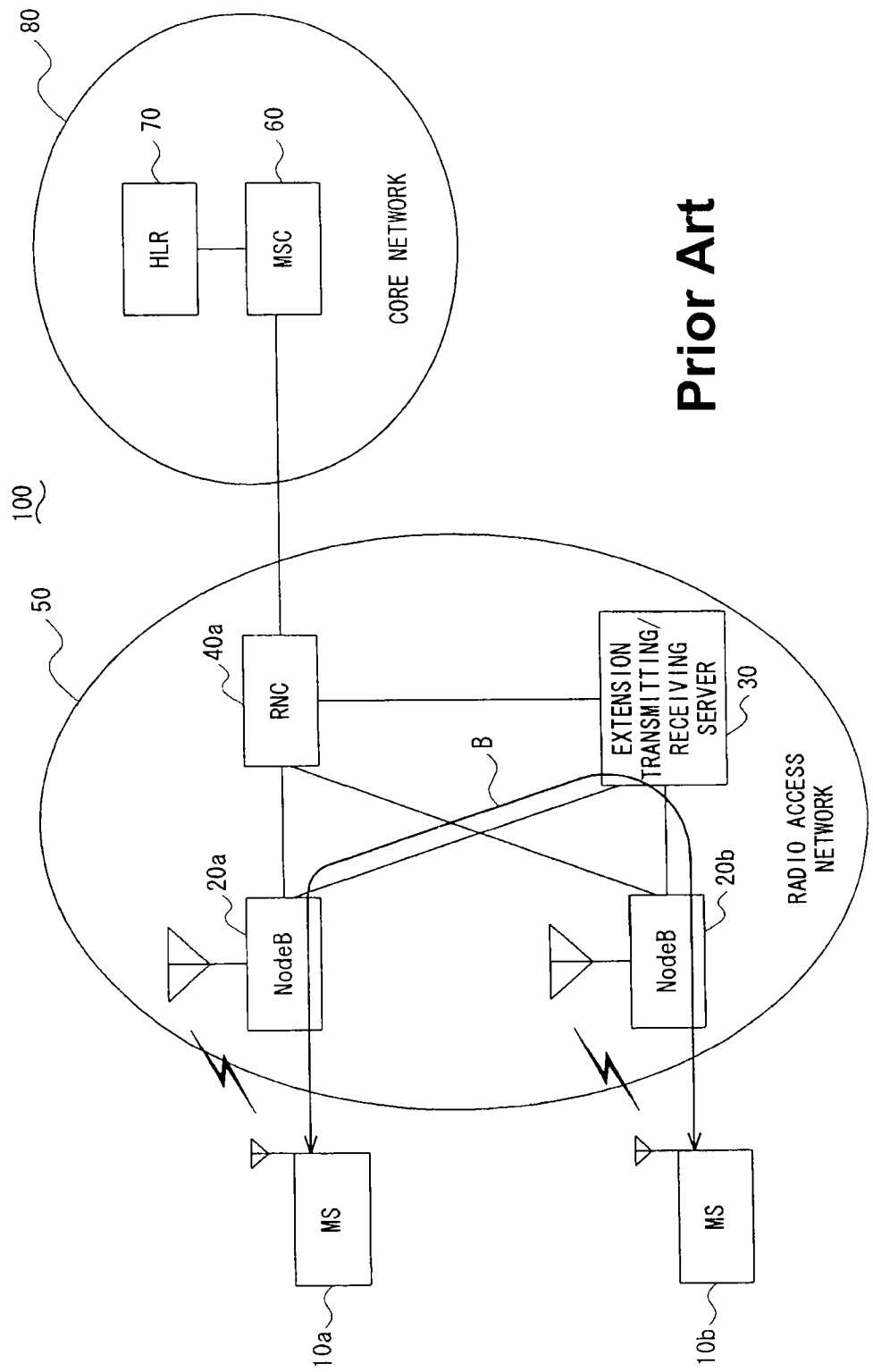
FIG. 16 is a view showing the configuration of the conventional mobile communication system using the extension transmitting/receiving server.
Figure 17:
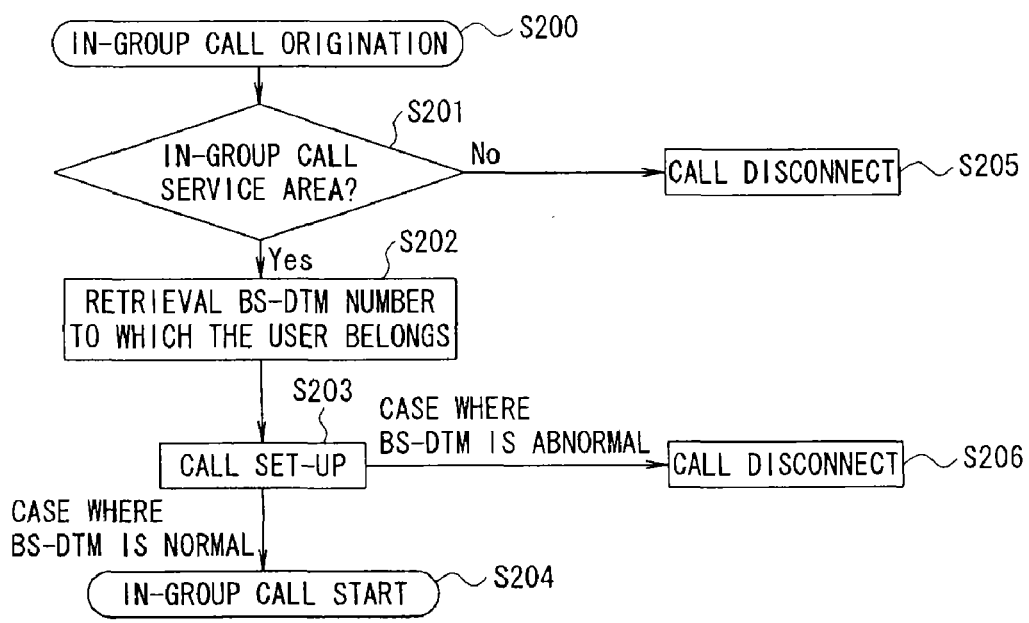
FIG. 17 is a flowchart showing the conventional processing flow for starting the extension call.

FIG. 6B is a schematic view showing an instance where multiple BS-DTMs are provided in a company. Referring to FIG. 6B, the BS-DTM 30a is provided on the third floor of a three-story building, and the BS-DTM 30b is provided on the second floor of the same building. Also, two NodeBs 20a and 20b are connected to the BS-DTM 30a, and one NodeB 20c is connected to the BS-DTM 30b. The NodeB 20a is provided on the third floor, the NodeB 20b is provided on the second floor, and the NodeB 20c is provided on the first floor. In this method, even if the number of persons exceeding the processing capability of a single BS-DTM are accommodated in the company, an extension call is allowed anywhere in the three-story building. For example, the extension call can be made between a person on the second floor and another person on the first floor, through the NodeB 20b, BS-DTM 30a, BS-DTM 30b and NodeB 20c in this order, as indicated by the broken line in FIG. 6B. Although two BS-DTMs are provided according to the present embodiment, an extension call is available in the MS belonging to the group, if the BS-DTM is additionally provided in accordance with the number of the persons using the extension call, namely the number of MSs registered as one group.

FIG. 7A is a schematic view showing an instance where one BS-DTM is commonly used among multiple companies. Referring to FIG. 7A, Company A has its office on the second floor of a two-story building, and Company has its office on the first floor of the same building. In addition, the BS-DTM 30a is provided on the second floor of the building. Also, the NodeB 20a is provided on the second floor of the building, and the NodeB 20b is provided on the first floor of the building. Herein, each group is specified for each company, so the MS used by a person belonging to Company A is registered in the extension group of Company A, and the MS used by a person belonging to Company B is registered in the extension group of Company B. In this method, if the processing capability of one BS-DTM is satisfied, a plurality of companies can purchase jointly one BS-DTM, or make a lease contract, whereby the cost of installing the BS-DTM can be saved. Since the extension call between different groups is impossible, the intra-company confidential information is protected.

FIG. 7B is a schematic view showing an instance where a single extension group is configured for the business offices located at remote sites in the same company. Referring to FIG. 7B, the BS-DTM 30a is provided in Osaka Office of Company A, and the BS-DTM 30b is provided in Tokyo Office of Company A. The NodeB 20a is provided in Osaka Office of Company A, and the NodeB 20b is provided in Tokyo Office of Company A. Herein, it is possible to make an extension call between a person in Osaka Office and another person in Tokyo Office by registering all the MSs used by the persons belonging to the same Company A in the extension group (e.g., group A) of Company A, even if the persons belong to different offices. Since the MSs are registered in the same extension group, a person is able to make an extension call within an office of a business trip destination (an example is a case where a person in Tokyo Office makes a business trip to Osaka Office), and is also able to make an extension call from an office of a business trip destination to the office where the person originally belongs to. The BS-DTM 30a and the BS-DTM 30b are connected via a known WAN (Wide Area Network). In this method, since the extension call is allowed between the remote sites, the costs of external calls, namely call charges can be cut down.

(Multiple BS-DTMs Selecting Method)

Now, there are cases where only one BS-DTM is selected and two or more BS-DTMs are selected in a system including multiple BS-DTMs as shown in FIG. 1. These cases will be described below.

The BS-DTM and its group ID are registered in the station data held in the RNC.

Also, to discriminate whether the NodeB and the BS-DTM are near or far, information on a location ID is also held as the station data. In the case where the call is originated and received within the area of an identical location ID, in consideration n of the location ID of the call originating NodeB and the location ID of the call incoming NodeB, a single BS-DTM is selected. In another case where the call is originated and received with the different location IDs, the different BS-DTMs are selected for the originating side and the receiving side.

(1) The BS-DTM firstly registered in a list where the station data is set is selected from among the BS-DTMs having the same group ID and the same location ID as the NodeB that has originated a call. Regarding the method for selecting the BS-DTM from the list where the station data is set, various algorithms can be considered depending on the configuration of the device.

(2) If the BS-DTM is not included in the same location ID, any BS-DTM is selected from among the BS-DTMs having the same group ID, even if the location ID is different.

(3) The BS-DTM to be used for receiving a call is selected from the location ID and the group ID of the NodeB on the receiving side. Herein, if the location IDs on the originating side and the receiving side are the same, a single BS-DTM is selected. If the location IDs are different, the different BS-DTMs are selected.

(4) If multiple BS-DTMs belonging to the same group are included in the same location ID, the same BS-DTM is basically selected on the both originating side and the receiving side.

The above control allows an appropriate BS-DTM to be selected.

(Extension Transmitting/Receiving Server Device Selecting Method)

According to the operation of the present system as described above with reference to FIG. 2, an extension transmitting/receiving server device selecting method is implemented in the system. That is, the extension transmitting/receiving server device selecting method for selecting an extension transmitting/receiving server device for transmitting or receiving user data transmitted or received between mobile station devices to or from a radio base station device by extension transmission or reception of data in a radio access network relaying data between a core network having a mobile switch station and the mobile station devices. The method includes: a step of determining whether or not a call is originated from an extension call area where an extension call is available (e.g., corresponding to step S301 in FIG. 2); a step of selecting at least one of the extension transmitting/receiving server devices belonging to the extension call area from which the call is originated, by referring to a management table for managing the statuses of multiple extension transmitting/receiving server devices, if the call is originated from the extension call area (e.g., corresponding to steps S302 to S303 in FIG. 2); and a step of performing a call set-up process using the selected extension transmitting/receiving server device (e.g., corresponding to step S304 in FIG. 2).

By employing the above method, it is made possible to control an appropriate selection from multiple extension transmitting/receiving server devices.

Industrial Applicability

The present invention is applicable to a case where user data is transmitted or received between mobile wireless terminals in a radio access network, without passing through a core network.

The invention claimed is:

1. A mobile communication system comprising:
 a plurality of extension transmitting/receiving server devices, each transmitting or receiving user data to be transmitted or received between mobile station devices, by employing extension transmission or reception of data in a radio access network relaying data between a core network having a mobile switch station and the mobile station devices; and
 a radio base station device that transmits or receives the user data to or from the extension transmitting/receiving server devices; and
 a server selecting unit for selecting at least one of the plurality of extension transmitting/receiving server devices by referring to a management table for managing statuses of the plurality of extension transmitting/receiving server devices;
 wherein the server selecting unit selects one of the plurality of extension transmitting/receiving server devices when a location ID of the radio base station device on a call originating side and a location ID of the radio base station device on a call receiving side are identical, and the server selecting unit selects different extension transmitting/receiving server devices when the location ID of the radio base station device on the call originating side and the location ID of the radio base station device on the call receiving side are different; and
 wherein the user data is transmitted through the extension transmitting/receiving server device selected by the server selecting unit.

2. The mobile communication system according to claim 1, wherein the management table includes, as an item of managing a status of an extension transmitting/receiving server device, at least one of:
 information indicating the radio base station device for preferentially selecting the extension transmitting/receiving server device;
 information indicating whether or not the extension transmitting/receiving server device is in a suspended status or operating status;
 information indicating whether or not the extension transmitting/receiving server device is in a maintenance status;
 information indicating the result of a periodical health check regarding the extension transmitting/receiving server device;
 information indicating a loaded status of the extension transmitting/receiving server device; and
 information indicating whether or not the extension transmitting/receiving server device is tested.

3. A wireless controller for use in a mobile communication system, the wireless controller comprising:
 a plurality of extension transmitting/receiving server devices that transmit or receive user data to be transmitted or received between mobile station devices, by employing extension transmission or reception of data in a radio access network relaying data between a core network having a mobile switch station and the mobile station devices;
 a radio base station device that transmits or receives the user data to or from the extension transmitting/receiving server devices; and
 a server selecting unit for selecting at least one of the plurality of extension transmitting/receiving server devices, by referring to a management table for managing statuses of the plurality of extension transmitting/receiving server devices;
 wherein the server selecting unit selects one of the plurality of extension transmitting/receiving server devices when a location ID of the radio base station device on a call originating side and a location ID of the radio base station device on a call receiving side are identical, and the server selecting unit selects different extension transmitting/receiving server devices when the location ID of the radio base station device on the call originating side and the location ID of the radio base station device on the call receiving side are different; and
 wherein the user data is transmitted through the selected extension transmitting/receiving server device.

4. The wireless controller according to claim 3, wherein the management table includes, as an item of managing the status of an extension transmitting/receiving server device, at least one of:
 information indicating the radio base station device for preferentially selecting the extension transmitting/receiving server device;
 information indicating whether or not the extension transmitting/receiving server device is in a suspended status or an operating status;
 information indicating whether or not the extension transmitting/receiving server device is in a maintenance status;
 information indicating the result of a periodical health check regarding the extension transmitting/receiving server device;
 information indicating a loaded status of the extension transmitting/receiving server device; and
 information indicating whether or not the extension transmitting/receiving server device is tested.

5. A method for selecting an extension transmitting/receiving server device that transmits or receives user data to be transmitted or received between mobile station devices, the method comprising:
 determining whether or not a call is originated from an extension call area where an extension call is available;
 selecting at least one extension transmitting/receiving server device belonging to the extension call area from which the call is originated by referring to a management table for managing the statuses of a plurality of extension transmitting/receiving server devices, if the call is originated from the area where the extension call is available; and
 performing a call set-up process using the selected extension transmitting/receiving server device,
 wherein the user data is transmitted to or received from a radio base station device, by employing extension or transmission of data in a radio access network relaying data between a core network having a mobile switch station and the mobile station devices,
 wherein the selecting step selects one of the plurality of extension transmitting/receiving server devices when a location ID of the radio base station device on a call originating side and a location ID of the radio base station device on a call receiving side are identical, and the selecting step selects different extension transmitting/receiving server devices when the location ID of the radio base station device on the call originating side and the location ID of the radio base station device on the call receiving side are different.

* * * * *